United States Patent
Schnabel

(10) Patent No.: US 11,407,153 B2
(45) Date of Patent: Aug. 9, 2022

(54) METHOD FOR PRODUCING A CLADDING PART FOR VEHICLES

(71) Applicant: HIB Trim Part Solutions GmbH, Bruchsal (DE)

(72) Inventor: Uwe Schnabel, Bruchsal (DE)

(73) Assignee: HIB Trim Part Solutions GmbH, Bruchsal (DE)

(*) Notice: Subject to any disclaimer, the term of this patent is extended or adjusted under 35 U.S.C. 154(b) by 203 days.

(21) Appl. No.: 16/710,041

(22) Filed: Dec. 11, 2019

(65) Prior Publication Data

US 2020/0108532 A1    Apr. 9, 2020

Related U.S. Application Data

(63) Continuation of application No. PCT/EP2018/075941, filed on Sep. 25, 2018.

(30) Foreign Application Priority Data

Oct. 5, 2017    (DE) .......................... 102017123108.0

(51) Int. Cl.
   *B29C 45/14*   (2006.01)
   *B29C 51/14*   (2006.01)
   *B29L 31/30*   (2006.01)
   *B60R 13/02*   (2006.01)

(52) U.S. Cl.
   CPC ........ *B29C 45/14786* (2013.01); *B29C 51/14* (2013.01); *B29L 2031/3005* (2013.01); *B32B 2605/003* (2013.01); *B60R 13/0206* (2013.01); *B60R 2013/0287* (2013.01)

(58) Field of Classification Search
   CPC ............... B29C 45/14786; B29C 51/14; B29L 2031/3005; B60R 2013/0287; B60R 13/0206; B32B 2605/003
   See application file for complete search history.

(56) References Cited

U.S. PATENT DOCUMENTS

6,187,233 B1    2/2001    Smith

FOREIGN PATENT DOCUMENTS

| CN | 107107550 A | 8/2017 |
|---|---|---|
| DE | 10 2015 100 925 A1 | 5/2016 |
| DE | 10 2016 205 194 A1 | 10/2016 |
| EP | 0 314 867 A2 | 5/1989 |
| FR | 2 868 733 A1 | 10/2005 |

(Continued)

OTHER PUBLICATIONS

Chinese Office Action (in Chinese) dated Jan. 28, 2021 in corresponding Chinese Application No. 201880025431.X.

(Continued)

*Primary Examiner* — D Glenn Dayoan
*Assistant Examiner* — Melissa Ann Bonifazi
(74) *Attorney, Agent, or Firm* — Harness, Dickey & Pierce, P.L.C.

(57) ABSTRACT

A method for producing a cladding part for vehicles with a cladding part body that forms a cladding in the mounted state. A sandwich panel is formed and extends two-dimensionally in a plane with at least one transparent thermoplastic upper layer, a prefabricated, postprocessing-free intermediate layer, and a thermoplastic base layer. The at least three-layered sandwich plate is subsequently three-dimensionally formed under the influence of heat into a sandwich element forming the cladding part body.

15 Claims, 3 Drawing Sheets

(56) References Cited

FOREIGN PATENT DOCUMENTS

| WO | WO-2005/065935 A1 | 7/2005 |
| WO | WO-2015/044099 A1 | 4/2015 |
| WO | WO-2017/009152 A1 | 1/2017 |

OTHER PUBLICATIONS

International Search Report dated Dec. 7, 2018 in corresponding PCT Application No. PCT/EP2018/075941.
German Search Report dated Nov. 4, 2019 in corresponding German Application No. 10 2017 123 108.0.
Chinese Office Action dated Jun. 21, 2021 in corresponding Chinse Application No. 201880025431.X.

METHOD FOR PRODUCING A CLADDING PART FOR VEHICLES

CROSS-REFERENCE TO RELATED APPLICATIONS

This application is a continuation of International Application No. PCT/EP2018/075941, filed Sep. 25, 2018, which claims priority to German Application No. 10 2017 123 108.0, filed Oct. 5, 2017. The disclosures of the above applications are incorporating herein by reference.

FIELD

The disclosure relates to a method for producing a cladding part or decorative part for vehicles, in particular for a vehicle interior.

BACKGROUND

Generic cladding parts are used in the prior art as interior cladding, for example, dashboard cladding of motor vehicles. In the mounted state, usually only the cladding part body may be seen of the cladding parts. The rear carrier structures or retaining elements or the further fastening positions are countersunk in the dashboard. The cladding part body therefore forms the visible side of the cladding parts. Usually, it includes a layer determining the appearance, for example, wood veneer, carbon fabric, or an aluminum layer.

A standard production process of a cladding part, according to the prior art, having a wood veneer appearance includes the production steps of the veneer blank at the desired component size, the one-sided lamination of the veneer blank with a plastic, so that a two-layered intermediate product results. This is subsequently followed by the calibration of the veneer to the desired thickness, the three-dimensional forming of the two-layered, laminated veneer blank to the desired final shape of the cladding part body, and the plastic back injection of a carrier structure on the side of the cladding part body where the lamination is located. Surface postprocessing and repair steps and also the coloration of the veneer to the desired appearance subsequently take place. Finally, an adhesion promoter (primer) and a surface finishing lacquer made of polyurethane are applied to the veneer. The primer is required to form a bond with the polyurethane lacquer.

The standard process supplies high-quality cladding parts. However, it is disadvantageous that the forming radius is restricted in the three-dimensional forming of the laminated veneers or carbon fabrics. At very small radii, in particular of less than 2.5 mm, cracks or fractures easily form in the veneer or the carbon layer, respectively. This is due to the yield strength of the material being exceeded. Moreover, forming can only be carried out very slowly, since a holding time is necessary in the mold. This ensures that residual moisture does not remain in the veneer. Furthermore, overall a high number of production steps are to be passed through, that means a significant time expenditure.

The disclosure is therefore based on the object of providing a method for producing a cladding part, that offers the option of implementing very small forming radii. Moreover, the disclosure is to meet the precondition of being carried out faster and more cost-effectively. Thus, the production time per cladding part drops.

SUMMARY

This object is achieved by the combination of features according to a method for producing a cladding part for vehicles with a cladding part body forming a panel in the mounted state. A sandwich plate extends two-dimensionally in a plane with at least one transparent thermoplastic upper layer, a prefinished, postprocessing-free intermediate layer, and a thermoplastic base layer. Three-dimensional forming the at least three-layered sandwich plate under the influence of heat into a sandwich element. Forming the cladding part body.

According to the disclosure, a method is proposed to produce vehicles cladding parts with a cladding part body forming a cladding in the mounted state. During the method, a sandwich plate extending two-dimensionally in a plane, is formed with at least one transparent thermoplastic upper layer, a prefinished, postprocessing-free intermediate layer, and a thermoplastic base layer. The resulting at least three-layered sandwich plate is subsequently three-dimensionally formed under the influence of heat into a sandwich element forming the cladding part body.

A differentiation is made in the present case between the terms cladding part and cladding part body. The cladding part body represents the main element of the cladding part visible in the mounted state. It can even form the cladding part alone, for example, if it is to be adhesively bonded. However, it is also an embodiment of the method according to the disclosure to provide the cladding part body with further elements, such as a carrier part or fastener (e.g., clips, hooks, latches) or frames. These parts then also become elements of the cladding part.

To define the directions, the upper layer is oriented toward the front visible side of the cladding part. The base layer is oriented toward the rear side or installation side. The prefinished, postprocessing-free intermediate layer has the desired final state from the beginning. A possible coloration has already taken place. The intermediate layer thickness also corresponds to the previously defined desired layer thickness. In preferred embodiment variants, the prefinished, postprocessing-free intermediate layer is formed by a pre-colored veneer, a film, a fabric, for example, carbon fabric, a pre-colored paper, or corresponding decorative carriers usable in the art.

The method according to the disclosure firstly creates the at least three-layered two-dimensional sandwich plate. The intermediate layer, essential for the appearance of the cladding part, is protected on both sides by the thermoplastic upper layer and the thermoplastic base layer. The thermoplastic material of the upper layer and base layer can be three-dimensionally formed under the influence of heat together with the intermediate layer. The upper layer and the base layer protect the intermediate layer in the forming process step by pressure on both sides. Thus, this increases the yield strength of the intermediate layer. Also, it prevents cracking or fracturing even at very small radii. The temperature is established in this case at a minimum value that is sufficiently high. Thus, the respective thermoplastic material used passes through the forming process without damage or visual losses. One advantageous temperature value is the respective glass transition temperature Tg of the thermoplastic.

The method according to the disclosure is distinguished in one embodiment variant in that at least the base layer is applied to the intermediate layer in a strip lamination process. The strip lamination process is performed by supplying the intermediate layer as a strip material from a roll. It is then subsequently laminated on the thermoplastic base layer.

In one embodiment according to the disclosure, the upper layer is also applied in a strip lamination process or in the continuous lacquering method to the intermediate layer. A two-dimensional sandwich plate results in the size of the roll or strip material as a starting endless material. It is furthermore advantageous, in this case, that the intermediate layer is already completely dehumidified in the strip lamination process.

If the strip lamination process is used, the sandwich plate is produced in a strip run method. It is cut to size from a sandwich strip in a predetermined final shape of the cladding part body before the forming. The production duration of the at least three-layered sandwich plate with an intermediate layer, that already has the desired final state with respect to its coloration and surface structure, and the cutting to size of individual sandwich plate segments from the strip material already very substantially shortens the production time of the base material in relation to the described standard process before initiation of a forming process.

The forming process itself also requires less time expenditure in the method according to the disclosure. The forming can be carried out faster due to the provision of an at least three-layered sandwich plate with upper layer and base layer. The retention time in the forming tool is also significantly less. This is due to the dehumidification already occurring during the lamination of the base layer.

Advantageous exemplary embodiments provide that the upper layer has a layer thickness of 0.2-0.4 mm. The intermediate layer has a layer thickness of 0.2-0.3 mm. The base layer has a layer thickness of 0.15-0.3 mm. A solution is particularly advantageous where the layer thickness of the upper layer, the intermediate layer, and the base layer is identical. This has the result that the prefinished, postprocessing-free intermediate layer is formed as a layer of the sandwich plate that corresponds to the neutral fiber (also called zero line). The neutral fiber in the forming process is the layer of the sandwich plate cross section, the length of which does not change upon bending. The intermediate layer as the middle layer is therefore stress-free in the best case during the forming process, in any case. However, the traction, compression, and shear tensions on the intermediate layer are reduced during the three-dimensional forming of the sandwich plate.

The thermoplastic upper layer is preferably formed by a thermoplastic polyurethane film (TPU film). At least one layer is made of polyurethane lacquer (for example, polyurethane DD lacquer). The thermoplastic base layer is formed by a thermoplastic polyurethane layer and/or a lamination comprising a thermoplastic with braided fabric. The thermoplastic polyurethane layer can also be a TPU film as an exemplary embodiment in this case.

It is also provided in the method according to the disclosure that a surface finishing layer made of polyurethane lacquer is applied to the upper layer of the three-dimensionally formed cladding part body. The use of the thermoplastic polyurethane film and/or at least one layer made of polyurethane lacquer for the upper layer moreover has the advantage that an adhesion promoter (primer) can be omitted, in order to apply the surface finishing layer. Since both the upper layer and the surface finishing layer are formed from the same material or at least from polyurethane material, the layers form a permanent solid bond even without primer. For example, in a RIM method (reaction injection molding method). The intermediate layer is thus formed primer-free. The additional step of the application of a primer described in the standard process can be avoided. This further shortens the production duration and reduces production costs.

In one further development of the method, the base layer of the sandwich element forming the cladding part body is back injected using plastic in the injection molding method after forming. A variant of injection-compression molding is also comprised in this case. In injection-compression molding, a pattern is generated through the base layer on the intermediate layer during the injection molding, via the injection pressure, without fractures or cracks. The pattern is determined by the tool inner wall and is therefore variably definable. Furthermore, in this way a groove for a raised strip or a predetermined structuring of the surface of the intermediate layer can be created with high repetition accuracy in this way.

As a further combination variant, the method according to the disclosure comprises an intermediate layer formed, in particular, by a pre-colored veneer, a film, or a pre-colored paper. The upper layer is formed from a layer of polyurethane lacquer and a layer of thermoplastic polyurethane film. A fabric layer is arranged between the layer of polyurethane lacquer and the layer of thermoplastic polyurethane film. The fabric layer is preferably formed as a metal fabric. Thus, a combination of metal on a veneer or paper is producible. The fabric layer is supplied in one exemplary embodiment pre-shrunk as a roll material. Via a roll, it is laid or drawn exactly positioned on the sandwich plate. The attachment to the surface finishing layer is still exclusively provided via the polyurethane material.

In addition to the method, the disclosure also comprises a cladding part that was produced according to an exemplary embodiment of the above-described method.

Other advantageous further developments of the disclosure are characterized in the dependent claims or are explained in more detail below with reference to the figures and together with a preferred embodiment of the disclosure.

DRAWINGS

The drawings described herein are for illustrative purposes only of selected embodiments and not all possible implementations, and are not intended to limit the scope of the present disclosure.

DETAILED DESCRIPTION

Figure 1:
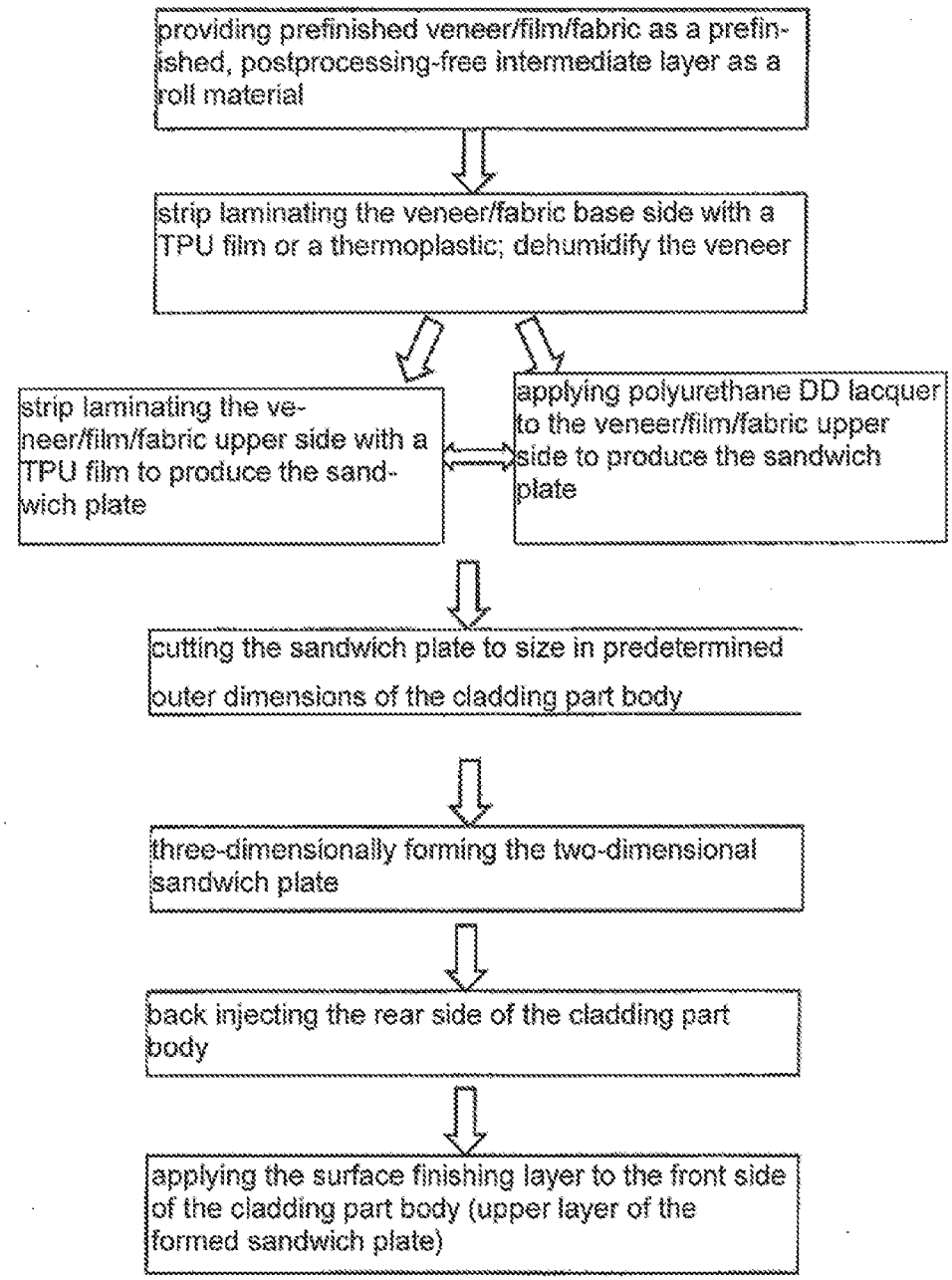
FIG. 1 is a method sequence according to the disclosure in a flow chart.

In FIG. 1, a method sequence using the strip run method and providing the starting material for the intermediate layer from a roll is illustrated by way of example. A pre-colored, postprocessing-free veneer or carbon fabric is provided as the intermediate layer. Subsequently, a TPU film or a thermoplastic having fabric as the base layer is produced on the intermediate layer in the strip lamination process. If a veneer is used, it is already dehumidified during the strip lamination. The upper layer can optionally be applied in the strip lamination process and/or in the lacquering method to the visible side of the intermediate layer. A polyurethane DD lacquer is preferred as the lacquer. The resulting sandwich plate corresponds in the strip run method to an endless material. The elements are cut out of the material later to form the cladding part body. The outer dimensions of the cladding part body are thus defined. However, the sandwich plate is still a two-dimensional plate body. Subsequently, the forming is carried out with introduction of heat. Thus, the three-dimensional cladding part body is brought into its final form. The rear side, i.e., the base layer, is back injected using plastic, for example, to apply a carrier structure. On the front side, a surface finishing layer made of polyurethane lacquer is applied to the upper layer of the cladding part body.

Figure 2:
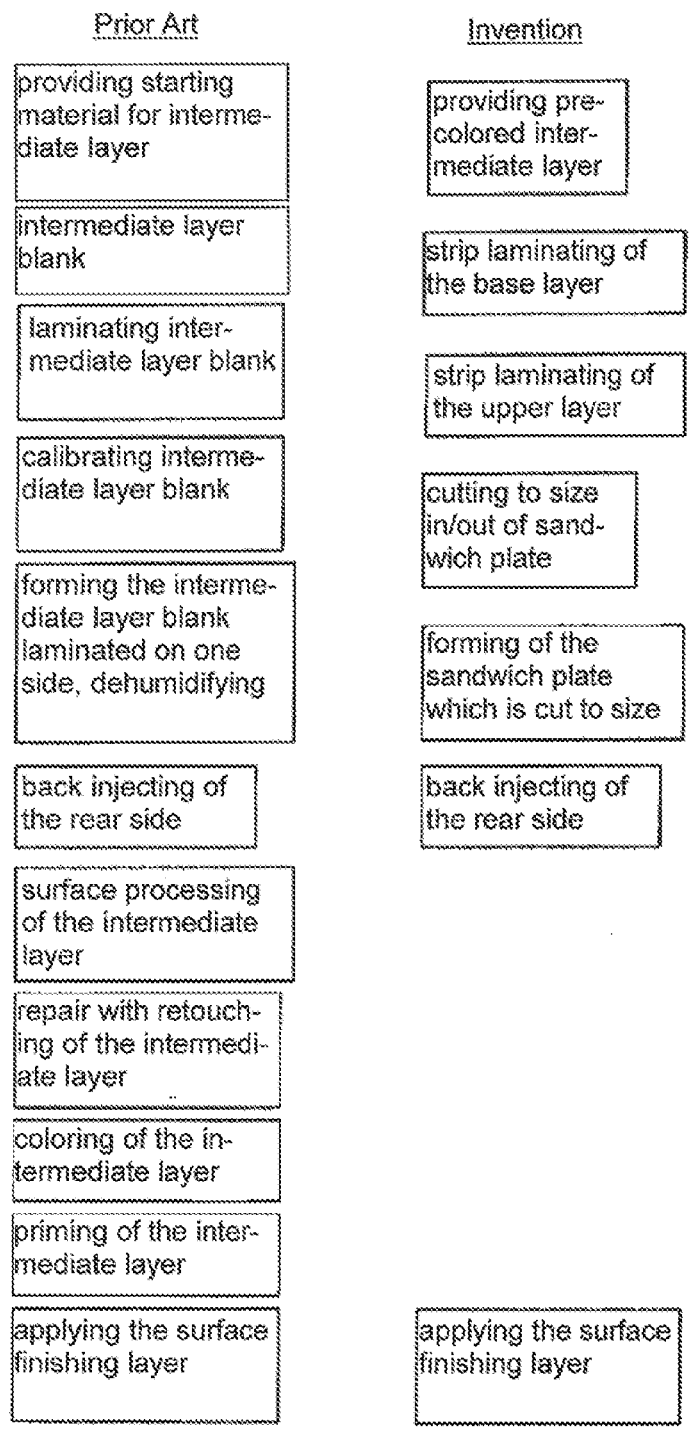
FIG. 2 is a comparison of a method according to the disclosure to the standard method.
Figure 3:
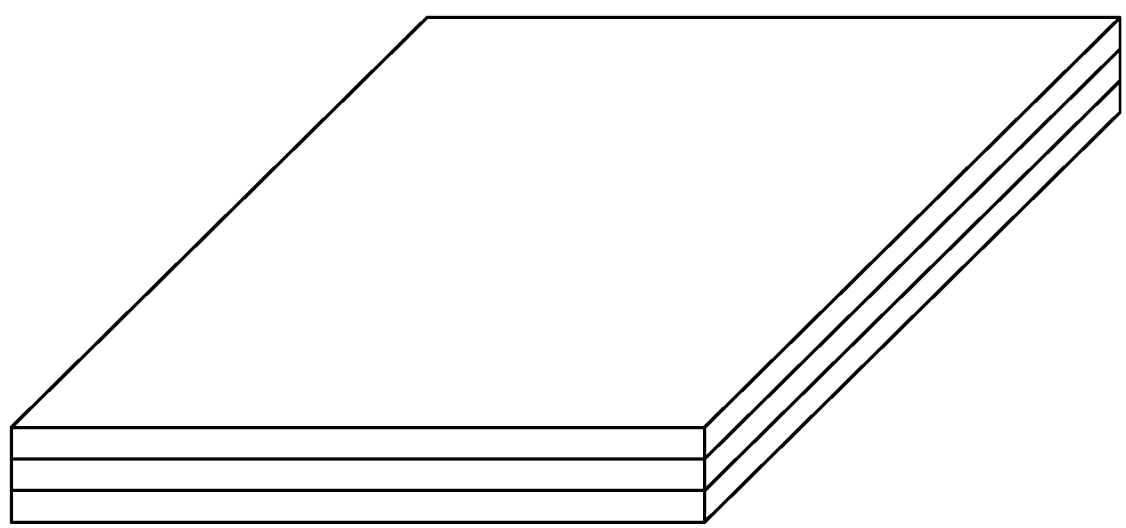
FIG. 3 is a perspective view of a cladding part.

FIG. 2 compares the advantages of the method according to the disclosure in the embodiment according to FIG. 1 to the described standard method. Multiple method steps are no longer necessary in the method according to the disclosure. For example, these steps are no longer necessary: the lamination and calibration of each individual component; the surface processing and repair of the veneer or fabric; the coloration of the veneer, the film, or the fabric; and the priming. Admittedly, the costs for the prefinished, postprocessing-free starting material of the intermediate layer, a corresponding finally prepared and already colored veneer or (carbon) fabric or a corresponding film are more expensive. The present additional expenditure is more than compensated for in the course of the method. The method according to the disclosure reduces the required production time per cladding part by approximately 50% in relation to the standard process. The production costs are reduced by approximately 30%. The passage times of the components, the discard costs, and the evaluation of the logistics areas between the individual processes are not even taken into consideration in this case.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for producing a cladding part for vehicles having
   a cladding part body forming a panel in the mounted state, comprising:
   a sandwich plate extending two-dimensionally in a plane having at least one transparent thermoplastic upper layer, a prefinished, postprocessing-free intermediate layer, and a thermoplastic base layer;
   cutting the sandwich plate to size from a sandwich strip into a predetermined final shape of the cladding part body;
   three-dimensional forming the at least three-layered sandwich plate under the influence of heat into a sandwich element; and
   forming the cladding part body.

2. The method according to claim 1, further comprising applying at least the base layer to the intermediate layer in a strip lamination process.

3. The method according to claim 1, further comprising applying the upper layer to the intermediate layer in a strip lamination process or in the continuous lacquering method.

4. The method according to claim 2, further comprising dehumidifying the intermediate layer in the strip lamination process.

5. The method according to claim 1, further comprising, before forming, producing the sandwich plate in a strip run method, cutting it to size from a sandwich strip into a predetermined final shape of the cladding part body.

6. The method according to claim 1, further comprising forming the prefinished, postprocessing-free intermediate layer by a prefinished veneer, pre-colored paper, a prefinished film, a fabric, in particular a real carbon fabric layer, or a decorative carrier.

7. The method according to claim 1, further comprising forming the prefinished, postprocessing-free intermediate layer by a layer of the sandwich plate that corresponds to the neutral fiber.

8. The method according to claim 1, further comprising forming the thermoplastic upper layer by a thermoplastic polyurethane film and/or at least one layer made of polyurethane lacquer.

9. The method according to claim 1, further comprising forming the thermoplastic base layer by a thermoplastic polyurethane layer and/or a lamination comprising a thermoplastic with braided fabric.

10. The method according to claim 1, wherein the upper layer has a layer thickness of 0.2-0.4 mm, the intermediate layer has a layer thickness of 0.2-0.3 mm, and the base layer has a layer thickness of 0.15-0.3 mm, wherein in particular the upper layer, the intermediate layer, and the base layer each have an identical layer thickness.

11. The method according to claim 1, further comprising applying a layer made of polyurethane lacquer to the upper layer of the three-dimensionally formed cladding part body as a surface finishing layer.

12. The method according to claim 1, further comprising back injecting the base layer of the sandwich element forming the cladding part body using plastic in an injection molding method.

13. The method according to claim 1, further comprising forming the intermediate layer by a pre-colored veneer, a prefinished film, or a pre-colored paper and forming the upper layer by a layer of polyurethane lacquer and a layer of thermoplastic polyurethane film, and arranging a fabric layer between the layer of polyurethane lacquer and the layer of thermoplastic polyurethane film.

14. The method according to claim 13, further comprising supplying the fabric layer pre-shrunk as a roll material via a roll and laying it on the sandwich plate.

15. A cladding part produced according to a method for producing a cladding part for vehicles with a cladding part body forming a panel in the mounted state, comprising:
   a sandwich plate extending two-dimensionally in a plane having at least one transparent thermoplastic upper layer, a prefinished, postprocessing-free intermediate layer, and a thermoplastic base layer;
   three-dimensional forming the at least three-layered sandwich plate under the influence of heat into a sandwich element; and
   forming the cladding part body.

* * * * *

UNITED STATES PATENT AND TRADEMARK OFFICE
CERTIFICATE OF CORRECTION

PATENT NO. : 11,407,153 B2
APPLICATION NO. : 16/710041
DATED : August 9, 2022
INVENTOR(S) : Uwe Schnabel Page 1 of 1

It is certified that error appears in the above-identified patent and that said Letters Patent is hereby corrected as shown below:

On the Title Page

<u>Second Page</u>
Column 1, item (56) Foreign Patent Documents, Line 2 "WO-201 5/044099" should be
--WO-2015/044099--

Signed and Sealed this
Twenty-ninth Day of November, 2022

Katherine Kelly Vidal
*Director of the United States Patent and Trademark Office*